United States Patent
Abu Antoun et al.

(10) Patent No.: US 12,202,110 B2
(45) Date of Patent: Jan. 21, 2025

(54) WORKING TOOL

(71) Applicant: Hilti Aktiengesellschaft, Schaan (LI)

(72) Inventors: Chafic Abu Antoun, Buchs (CH);
Albert Binder, Buchs (CH); Florian Schmid, Buchs (CH); Thomas Franz, Liesberg Dorf (CH); Reto Christen, Uster (CH); Jasmin Smajic, Schöfflisdorf (CH)

(73) Assignee: Hilti Aktiengesellschaft, Schaan (LI)

( * ) Notice: Subject to any disclaimer, the term of this patent is extended or adjusted under 35 U.S.C. 154(b) by 164 days.

(21) Appl. No.: 17/783,413

(22) PCT Filed: Dec. 10, 2020

(86) PCT No.: PCT/EP2020/085503
§ 371 (c)(1),
(2) Date: Jun. 8, 2022

(87) PCT Pub. No.: WO2021/122294
PCT Pub. Date: Jun. 24, 2021

(65) Prior Publication Data
US 2023/0011145 A1   Jan. 12, 2023

(30) Foreign Application Priority Data
Dec. 20, 2019   (EP) ..................... 19218900

(51) Int. Cl.
*B25C 1/06* (2006.01)
*H02K 11/00* (2016.01)
*H02K 33/12* (2006.01)

(52) U.S. Cl.
CPC ............ *B25C 1/06* (2013.01); *H02K 11/0094* (2013.01); *H02K 33/12* (2013.01)

(58) Field of Classification Search
CPC ....... B25C 1/06; H02K 11/0094; H02K 33/12
See application file for complete search history.

(56) References Cited

U.S. PATENT DOCUMENTS 4,480,523 A * 11/1984 Young ..................... F41B 6/006
                                                        89/8
5,440,183 A *  8/1995 Denne ................... F15B 15/088
                                                        310/12.26
(Continued)

FOREIGN PATENT DOCUMENTS

WO   WO 2018/104406 A1   6/2018
WO   WO 2019/211264 A1   11/2019
WO   WO 2019/233845 A1   12/2019

OTHER PUBLICATIONS

International Searching Authority, International Search Report and Written Opinion in International Application No. PCT/EP2020/085503, mailed Feb. 18, 2021.

*Primary Examiner* — Andrew M Tecco
*Assistant Examiner* — Nicholas E Igbokwe
(74) *Attorney, Agent, or Firm* — Leydig, Voit & Mayer, Ltd.

(57) ABSTRACT

A tool for working a substrate, the tool having a stator and a working piston, which is intended to move relative to the stator along a working axis, also having a drive, which is intended to drive the working piston from a starting position along the working axis to the substrate, the drive comprising a piston coil arranged on the working piston and a first stator coil arranged on the stator, the piston coil having a piston coil axis, which is oriented transversely, to the working axis.

20 Claims, 5 Drawing Sheets

(56) References Cited

U.S. PATENT DOCUMENTS

| | | | |
|---|---|---|---|
| 6,830,173 B2 | 12/2004 | Barber et al. | |
| 2009/0201016 A1* | 8/2009 | Hattersley | G01R 33/1215 |
| | | | 324/239 |
| 2010/0032468 A1* | 2/2010 | Gross | B25C 1/06 |
| | | | 227/156 |
| 2013/0334277 A1* | 12/2013 | Shima | B25C 1/06 |
| | | | 318/114 |
| 2015/0211596 A1* | 7/2015 | Battlogg | F16F 9/3214 |
| | | | 29/605 |
| 2019/0326805 A1 | 10/2019 | Mecklenburg et al. | |
| 2021/0060750 A1 | 3/2021 | Dittrich et al. | |

* cited by examiner

WORKING TOOL

CROSS-REFERENCE TO RELATED APPLICATIONS

This patent application is the U.S. National Stage of International Patent Application No. PCT/EP2020/085503, filed Dec. 10, 2020, which claims the benefit of European Patent Application No. 19218900.9, filed Dec. 20, 2019, which are each incorporated by reference.

The present invention relates to a tool, such as for example a setting tool for driving fastening elements into a substrate.

Such tools often have a working piston, which is intended to move along a working axis. The working piston is driven by a drive, which accelerates the working piston. WO 2018/104406 A1 describes a drive, which has an electrical capacitor, a squirrel-cage rotor arranged on the working piston and an excitation coil, which during rapid discharge of the capacitor is flowed through by current and generates a magnetic field that accelerates the working piston.

Setting tools usually have a receptacle for a fastening element, from which a fastening element received therein is transferred into the substrate along a working axis. For this, the working element is driven toward the fastening element along the working axis by the drive. U.S. Pat. No. 6,830,173 B2 discloses a setting tool with a drive, which has an electrical capacitor and a coil.

The object of the present invention is to provide a setting tool of the aforementioned type with which high efficiency and/or good setting quality are ensured.

The object is achieved with a preferably hand-held tool for working a substrate, having a stator and a working piston, which is intended to move relative to the stator along a working axis, also having a drive, which is intended to drive the working piston from a starting position along the working axis to the substrate, the drive comprising a piston coil arranged on the working piston and a first stator coil arranged on the stator, the piston coil having a piston coil axis, which is oriented transversely to the working axis. The piston coil axis is preferably oriented perpendicularly to the working axis. An advantageous embodiment is characterized in that the drive comprises a switching circuit by means of which the rapid discharge is triggered and/or the piston coil is electrically connected to the capacitor.

An advantageous embodiment is characterized in that the first stator coil has a first stator coil axis, which is oriented parallel to the piston coil axis. The piston coil axis is preferably arranged offset relative to the first stator coil axis in the direction of the working axis when the working piston is in the starting position. An advantageous embodiment is characterized in that the tool has a guide element for guiding the working piston along the working axis.

An advantageous embodiment is characterized in that the piston coil and the first stator coil can be supplied with current in the same direction in order to generate magnetic fields in the same direction and to accelerate the piston coil axis to the first stator coil axis. Another advantageous embodiment is characterized in that the piston coil and the first stator coil can be supplied with current in opposite directions in order to generate opposing magnetic fields and to accelerate the piston coil axis away from the first stator coil axis.

An advantageous embodiment is characterized in that the drive has a second stator coil arranged on the stator, which is arranged opposite the first stator coil relative to the working axis and has a second stator coil axis, which is oriented parallel to the first stator coil axis, the first stator coil and the second stator coil being able to be supplied with current in the same direction in order to generate magnetic fields in the same direction and to accelerate the piston coil along the working axis. The second stator coil axis preferably coincides with the first stator coil axis.

An advantageous embodiment is characterized in that the drive has a first capacitor, the first stator coil and/or the piston coil being electrically connectable to the capacitor in order during rapid discharge of the first capacitor to have a current flowing through it and to generate the magnetic field.

An advantageous embodiment is characterized in that the piston coil and the first stator coil are electrically connected to one another in series and are wound in the same direction relative to one another. According to an alternative embodiment, the piston coil and the first stator coil are connected to one another in series and are wound in opposite directions relative to one another. Another advantageous embodiment is characterized in that the piston coil has a piston coil outer diameter, and the first stator coil having a stator coil outer diameter which is essentially the same size as the piston coil outer diameter.

An advantageous embodiment is characterized in that the stator has two electrical stator contacts and the working piston has two electrical piston contacts respectively sliding on one of the electrical stator contacts. Preferably, the electrical stator contacts have in each case a contact rail and the electrical piston contacts have in each case a contact brush or a slip ring, or vice versa.

An advantageous embodiment is characterized in that the stator has a stator frame of a soft magnetic material, which surrounds the first stator coil.

An advantageous embodiment is characterized in that the tool is designed as a setting device for driving fastening elements into a substrate, having a receptacle which is intended to receive a fastening element, the working piston or the stator being intended to transfer a fastening element received in the receptacle into the substrate along the working axis, and the drive being intended to drive the working piston onto the fastening element along the working axis.

In the context of the invention, a capacitor should be understood as meaning an electrical component that stores electrical charge and the associated energy in an electrical field. In particular, a capacitor has two electrically conducting electrodes, between which the electrical field builds up when the electrodes are electrically charged differently. In the context of the invention, a fastening element should be understood as meaning for example a nail, a pin, a clamp, a clip, a stud, in particular a threaded stud, or the like.

A soft magnetic material in the context of the invention should be understood as meaning a material which has a high magnetic saturation flux density and in particular a small coercive field strength, and thus reinforces a magnetic field penetrating the material. In particular, the soft magnetic material of the stator frame and/or the piston frame has a saturation flux density of at least 1.0 T, preferably at least 1.3 T, particularly preferably at least 1.5 T. In the context of the invention, an electrically conductive material should be understood as meaning a material that has a high specific electrical conductivity, so that a magnetic field passing through the material generates eddy currents in the material. A soft magnetic and/or electrically conductive material preferably consists of a ferromagnetic material, particularly preferably a ferromagnetic metal, for example iron, cobalt, nickel, or an alloy with one or more ferromagnetic metals as the main component.

The invention is represented in a number of exemplary embodiments in the drawings, in which.

Figure 1:
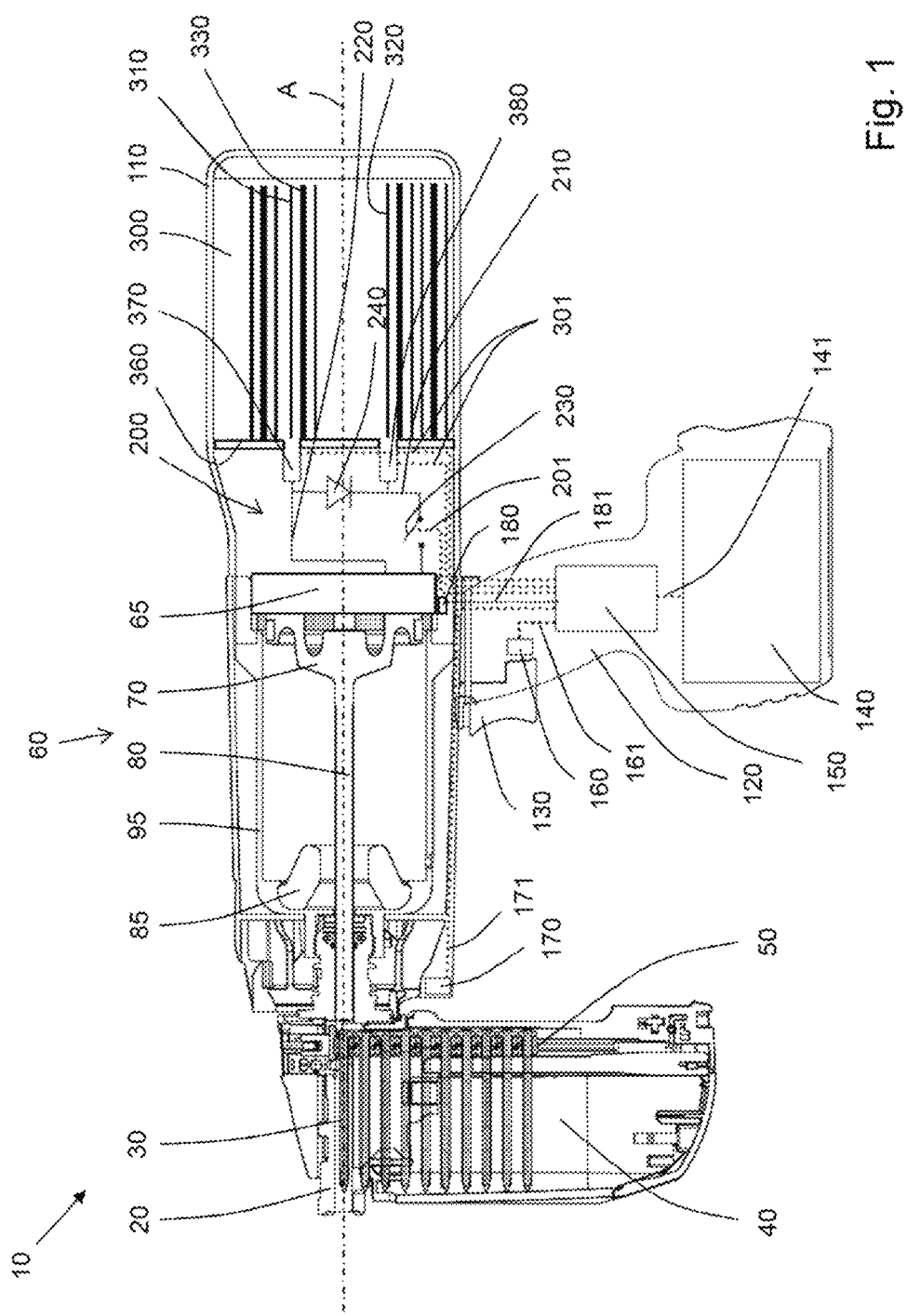
FIG. 1 shows a tool in a longitudinal section.

In FIG. 1, a tool 10 for working a substrate (not shown), which is designed as a hand-held setting device for driving fastening elements into the substrate, is shown in a longitudinal section. The tool 10 has a receptacle 20 which is formed as a stud guide and in which a fastening element 30 formed as a nail is received in order to be driven into the substrate along a working axis A (to the left in FIG. 1). For feeding fastening elements to the receptacle, the tool 10 comprises a magazine 40 in which the fastening elements are received individually or collectively in the form of a fastening element strip 50 and are transported one by one into the receptacle 20. To this end, the magazine 40 has a spring-loaded feed element, not specifically denoted.

The tool 10 has a working piston 60, which comprises a piston body 70 and a piston rod 80. The working piston 60 is intended to transfer the fastening element 30 out of the receptacle 20 along the working axis A into the substrate. In this case, the working piston 60 is guided with its piston body 70 in a guide cylinder 95 along the working axis A. In exemplary embodiments that are not shown, the working piston is guided along the working axis by two, three or more guide elements, for example guide rods. The working piston 60 is in turn driven by a drive 65, which comprises a switching circuit 200 and a capacitor 300. The switching circuit 200 is intended to bring about a rapid electrical discharge of the previously charged capacitor 300 and to feed the discharge current thereby flowing to the drive 65.

The tool 10 also comprises a housing 110, in which the drive 65 is received, a handle 120 with an actuating element 130 formed as a trigger, an electrical energy store 140 formed as a storage battery, a control unit 150, a trigger switch 160, a pressure switch 170, a temperature sensor 180 arranged on the drive 65 and electrical connecting lines 141, 161, 171, 181, 201, 301, which connect the control unit 150 to the electrical energy storage 140, the trigger switch 160, the pressure switch 170, the temperature sensor 180, the switching circuit 200 and the capacitor 300. In exemplary embodiments that are not shown, the tool 10 is supplied with electrical energy by means of a power cable instead of the electrical energy store 140 or in addition to the electrical energy store 140. The control unit comprises electronic components, preferably interconnected on a printed circuit board to form one or more electrical control circuits, in particular one or more microprocessors.

When the tool 10 is pressed against a substrate that is not shown (to the left in FIG. 1), a contact-pressure element, not specifically denoted, operates the contact-pressure switch 170, which as a result transmits a contact-pressure signal to the control unit 150 by means of the connecting line 171. Triggered by this, the control unit 150 initiates a capacitor charging process in which electrical energy is conducted by means of the connecting line 141 from the electrical energy store 140 to the control unit 150 and by means of the connecting lines 301 from the control unit 150 to the capacitor 300 in order to electrically charge the capacitor 300. To this end, the control unit 150 comprises a switching converter, not specifically denoted, which converts the electrical current from the electrical energy store 140 into a suitable charge current for the capacitor 300. When the capacitor 300 is charged and the working piston 60 is in its ready-to-set position shown in FIG. 1, the tool 10 is in a ready-to-set state. Since the charging of the capacitor 300 is only brought about by the tool 10 pressing against the substrate, to increase the safety of bystanders a setting process is only made possible when the setting tool 10 is pressed against the substrate. In exemplary embodiments that are not shown, the control unit already initiates the capacitor charging process when the tool is switched on or when the tool is lifted off the substrate or when a preceding driving-in process is completed.

When the actuating element 130 is actuated, for example by being pulled using the index finger of the hand holding the handle 120, with the tool 10 in the ready-to-set state, the actuating element 130 actuates the trigger switch 160, which as a result transmits a trigger signal to the control unit 150 by means of the connecting line 161. Triggered by this, the control unit 150 initiates a capacitor discharging process, in which electrical energy stored in the capacitor 300 is conducted by means of the switching circuit 200 from the capacitor 300 to the drive 65, in that the capacitor 300 is electrically discharged.

For this purpose, the switching circuit 200 schematically illustrated in FIG. 1 comprises two discharge lines 210, 220, which connect the capacitor 300 to the drive 65 and of which at least one discharge line 210 is interrupted by a normally open discharge switch 230. The switching circuit 200 with the drive 65 and the capacitor 300 may form an electrical oscillating circuit. Oscillation of this oscillating circuit back and forth and/or negative charging of the capacitor 300 may potentially have an adverse effect on the efficiency of the drive 65, but can be suppressed with the aid of a free-wheeling diode 240. The discharge lines 210, 220 are electrically connected in each case to an electrode 310, 320 of the capacitor 300 arranged on a carrier film 330 by means of electrical contacts 370, 380 of the capacitor 300 arranged on an end face 360 of the capacitor 300 facing the receptacle 20, for example by soldering, welding, screwing, clamping or a form fit. The discharge switch 230 is preferably suitable for switching a discharge current with a high current intensity and is formed for example as a thyristor. In addition, the discharge lines 210, 220 are at a small distance from one another, so that a parasitic magnetic field induced by them is as low as possible. By way of example, the discharge lines 210, 220 are combined to form a busbar and are held together by a suitable means, for example a retaining device or a clip. In exemplary embodiments which are not shown, the free-wheeling diode is connected electrically in parallel with the discharge switch. In further exemplary embodiments which are not shown, there is no free-wheeling diode provided in the circuit.

To initiate the capacitor discharge process, the control unit 150 closes the discharge switch 230 by means of the connecting line 201, whereby a high-intensity discharge current of the capacitor 300 flows through the drive 65, which drives the working piston 60 toward the receptacle 20 and the fastening element 30 received therein. As soon as the piston rod 80 of the working piston 60 meets a head, not specifically denoted, of the fastening element 30, the fastening element 30 is driven into the substrate by the working piston 60. Excess kinetic energy of the working piston 60 is absorbed by a braking element 85 of a spring-elastic and/or damping material, for example rubber or an elastomer, by the working piston 60 moving with the piston body thereof 70 against the braking element 85 and being braked by the latter until it comes to a standstill. The working piston 60 is then reset to the ready-to-set position by a resetting device that is not specifically denoted.

Figure 2:
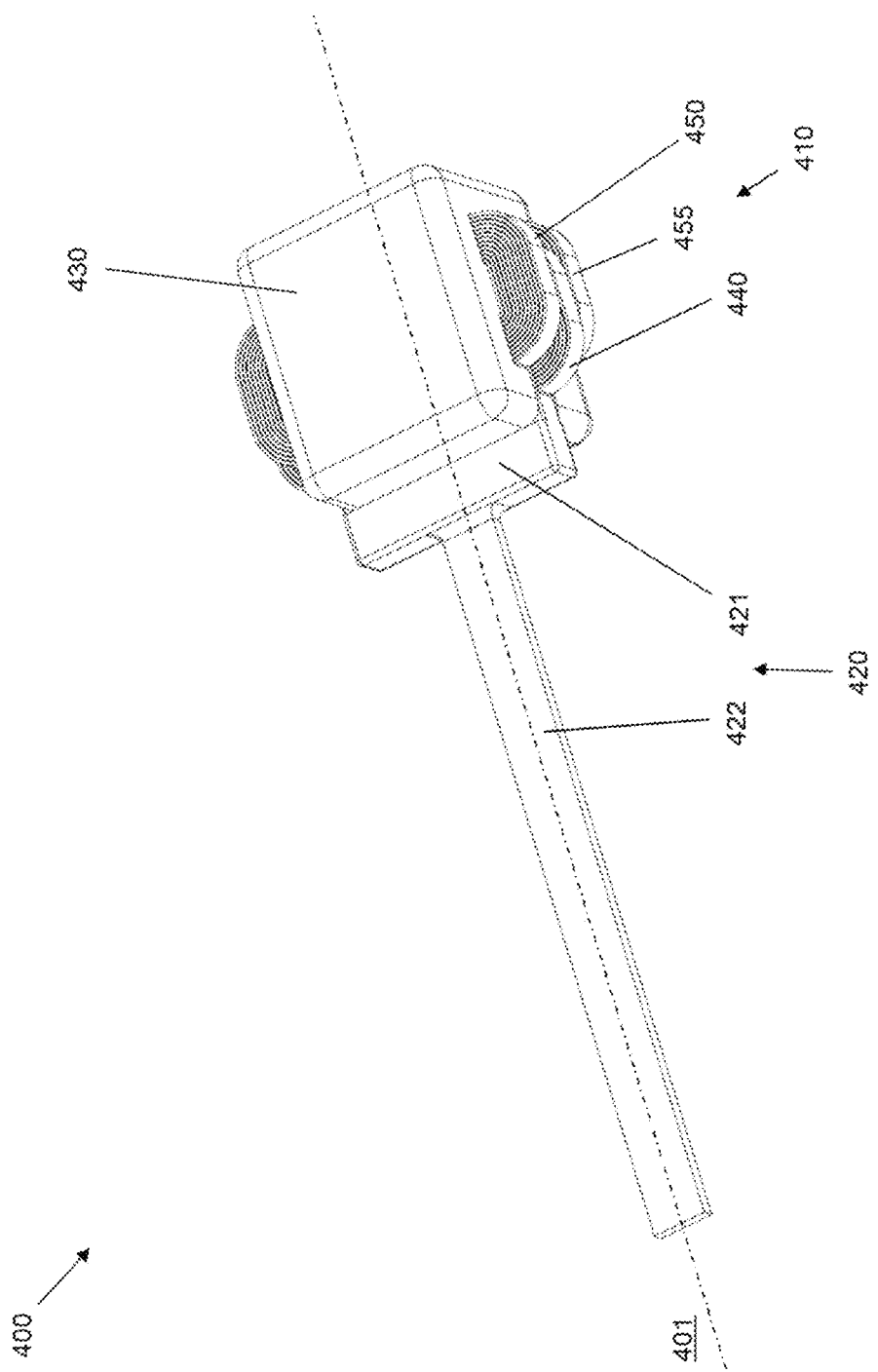
FIG. 2 shows a drive/working-piston unit of a tool in a perspective view.
Figure 3:
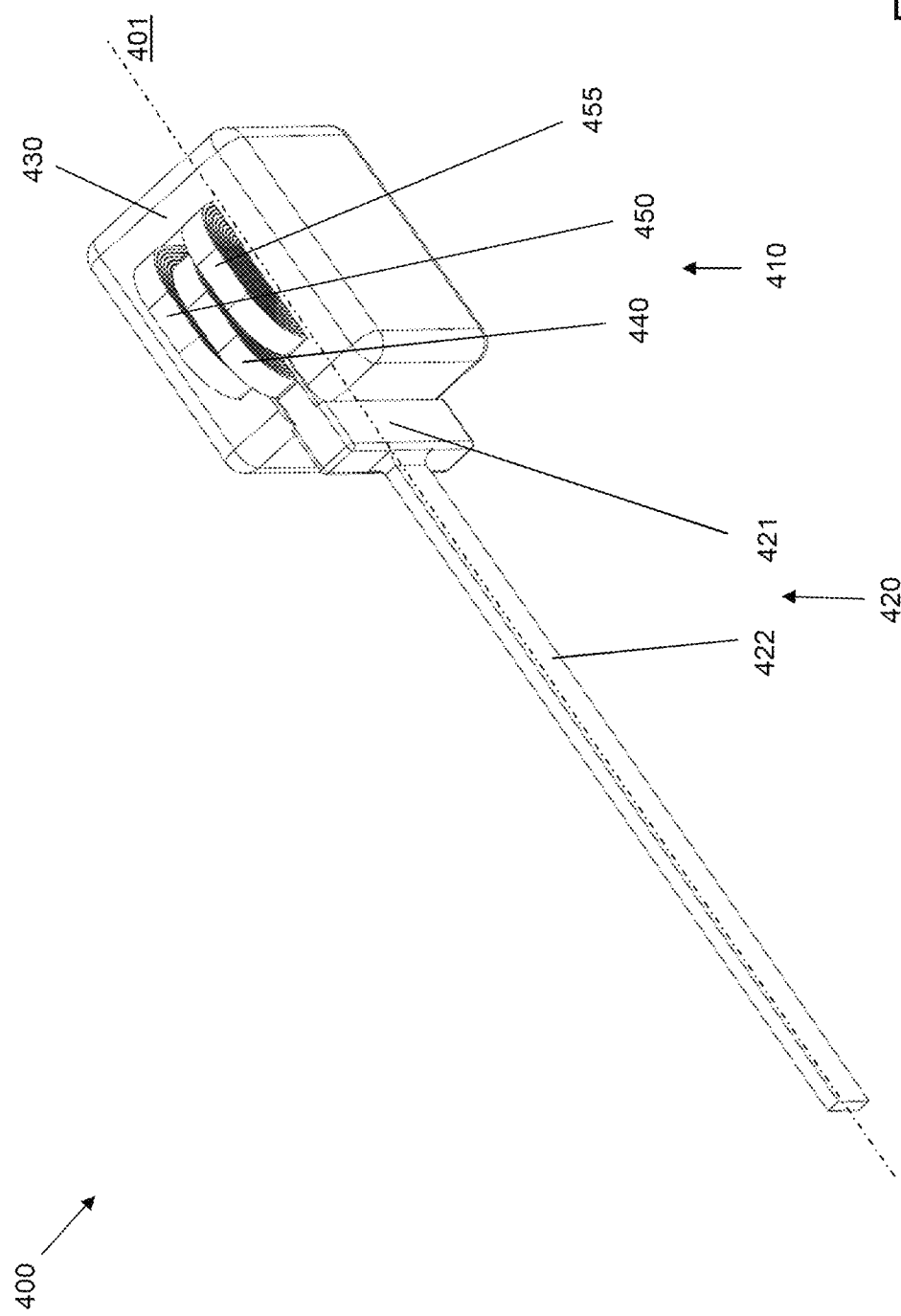
FIG. 3 shows a drive/working-piston unit from FIG. 2 in a further perspective view.

In FIG. 2-3, a drive/working-piston unit 400 of a tool, for example the tool 10 shown in FIG. 1, is illustrated from different angles. The drive/working-piston unit 400 comprises a partly shown drive 410, a working piston 420 and a stator 430. The working piston 420 has a piston body 421 and a piston rod 422 and is intended to move relative to the stator 430 along a working axis 401. The drive 410 is intended to drive the working piston 420 along the working axis 401. For this purpose, the drive 410 comprises a capacitor (not shown) and a piston coil 440 arranged on the working piston 420. The piston coil 440 can be electrically connected to the capacitor in order during rapid discharge of the capacitor to have a current flowing through it and to generate a magnetic field that brings about a repulsive force between the piston coil 440 and the stator 430 and accelerates the working piston 420 relative to the stator 430.

In addition, the drive 410 comprises a first stator coil 450 arranged on the stator 430 and a second stator coil 455 arranged on the stator 430. The stator coils 450, 455 can be electrically connected to the capacitor in order during rapid discharge of the capacitor to have a current flowing through them and to generate a magnetic field that brings about a repulsive force between the stator coils 450, 455 and the working piston 420 and accelerates the working piston 420 away from the stator 430. The repulsive force between the stator coil 450 and the working piston 420 is brought about for example by the magnetic field generated by the stator coils 450, 455 being opposite to the magnetic field generated by the piston coil 440. For this purpose, the first stator coil 450 and the second stator coil 455 are supplied with electrical current in the same direction, while the piston coil 440 is supplied with electrical current in the opposite direction and at the same time, by the capacitor being discharged.

The stator coils 450, 455 are arranged opposite one another on two sides of the working axis 401 and the piston coil 440 is arranged between the stator coils 450, 455 on the working axis 401. The piston coil 440 and the stator coils 450, 455 respectively have a piston coil axis and a stator coil axis, which are inclined perpendicularly relative to the working axis 401 and are oriented parallel to one another.

In FIG. 3, a drive 510 of a tool, for example the tool 10 shown in FIG. 1, is illustrated. The drive 510 is shown cut away along a working axis 501 and is intended to drive a working piston 520 with a piston body 521 and a piston rod 522 along the working axis 501 and to move it relative to a stator 530. The drive 510 comprises a capacitor 560, a switching circuit 570 with a switch 571 and a current control element 572 designed as a diode, in particular a freewheeling diode, a piston coil 540 arranged on the working piston 520, a first stator coil 550 arranged on the stator 530 and a second stator coil 550 arranged on the stator 530. The piston coil 540 and the stator coils 550, 555 can be electrically connected to the capacitor 560 in order during rapid discharge of the capacitor 560 to have a current flowing through them. A current flowing through the piston coil 540 generates a first magnetic field, while a current flow through the stator coils 550, 555 generates a second magnetic field.

One electrode of the capacitor 560 is electrically connected to an input of the switch 571 and can be charged with respect to a counter electrode of the capacitor 560, which is electrically connected to a ground potential (not shown), for example the negative terminal of an electrical rechargeable battery or a battery. An output of the switch 571 is electrically connected, preferably permanently wired, to an input of the first stator coil 550. An output of the first stator coil 550 is electrically connected, preferably permanently wired, to a first electrical stator contact 531, which is formed as a contact brush and which the stator 530 has. An input of the piston coil 540 is electrically connected, preferably permanently wired, to a first piston contact 541, which is formed as a contact rail and which the working piston 520 has. The first piston contact 541 slides in an electrically conducting manner along the first stator contact 531 when the working piston 520 moves along the working axis 501. A first spring (not shown) loads the first stator contact 531 toward the first piston contact 541. In exemplary embodiments that are not shown, a spring additionally or alternatively loads the first piston contact toward the first stator contact.

An output of the piston coil 540 is electrically connected, preferably permanently wired, to a second piston contact 542, which is formed as a contact rail and which the working piston 520 has. The second piston contact 542 slides in an electrically conducting manner along a second stator contact 532 when the working piston 520 moves along the working axis 501. The stator 530 has the second stator contact 532, which is formed as a contact brush and is electrically connected to an input of the second stator coil 555. An output of the second stator coil 555 is finally electrically connected to ground potential. A second spring (not shown) loads the second stator contact 532 toward the second piston contact 542. In exemplary embodiments that are not shown, a spring additionally or alternatively loads the second piston contact toward the first stator contact. The piston contacts 541, 542 do not necessarily contact the stator contacts 531, 532 during the entire movement of the working piston. In some applications, contacting during the first 0.5 ms to 1 ms, in particular during the first 0.6 ms, is sufficient. The piston contacts 541, 542 have a length in the direction of the working axis 501 which for some areas of application is approximately 10 mm to 30 mm.

The piston contacts 541, 542 are rigidly connected to the rest of the working piston 520 and move with the rest of the working piston 520. In exemplary embodiments that are not shown, the first and/or the second stator contact is formed as a slip ring. In further exemplary embodiments that are not shown, the first and/or the second stator contact is formed as a contact rail and the first or the second piston contact is formed as a contact brush or a slip ring. The second piston contact 542 and the second stator contact 532 are arranged radially within the stator coils 550, 555 and the piston coil 540 with respect to the coils 540, 550, 555.

The rapid discharge of the capacitor 560 via the piston coil 540 and the stator coil 550 can be triggered by means of the switching circuit 570, by the switch 571 being closed when the capacitor 560 is electrically charged and the piston coil 540 and the stator coils 550, 555 being electrically connected to the capacitor 560. The electrical current then flows from the capacitor 560 through the switch 571, through the first stator coil 550, through the first stator contact 531 and the first piston contact 541, through the piston coil 540, through the second piston contact 542 and the second stator contact 532 and finally through the second stator coil 555 to the capacitor 560 or to ground potential.

The piston coil 540 and the stator coil 550 respectively have a piston coil axis (540') and a stator coil axis (550'), which are oriented perpendicularly to the working axis 501 and parallel to one another. The piston coil 540 and the stator coils 550, 555 (the stator coils 550, 555 having respective stator core axes 550', 555') are wound in the same direction and the electrical current flows through them in opposite directions, so that the first magnetic field generated by the piston coil 540 and the second magnetic field generated by the stator coils 550, 555 are opposite to one another. In exemplary embodiments that are not shown, the coils are wound in opposite directions and the electrical current flows through them in the same direction. This brings about a repulsive force between the stator coils 550, 555 and the piston coil 540, and thus between the stator 530 and the working piston 520, so that the working piston 520 is accelerated relative to the stator 530. The piston coil 540 and the stator coils 550, 555 are electrically connected in series with one another, that is to say that electrical current flows through them at the same time, a current intensity of the current flowing through the coils 540, 550, 555 being the same for the piston coil 540 and the stator coil 550. In addition, the piston coil 540 and the stator coils 550, 555 preferably have in each case the same number of coil turns, so that the magnetic fields generated by the coils 540, 550, 555 are equally strong.

The working piston 520 has a piston frame 525, which preferably consists of a soft magnetic material, such as for example iron or an alloy thereof, for example steel. The piston frame 525 surrounds the piston coil 540. As a result, the first magnetic field generated by the piston coil 540 is intensified in the area of the stator coils 550, 555 and the repulsive force between the stator 530 and the working piston 520 is increased. The piston body 521 preferably consists of the soft magnetic material and particularly preferably forms the piston frame. The piston rod 522 also preferably consists of the soft magnetic material and is particularly preferably connected in one piece to the piston body 521, which may increase a stiffness and/or mechanical robustness of the working piston 520. The stator 530 has a stator frame 535, which preferably consists of a soft magnetic material, such as for example iron or an alloy thereof, for example steel. The stator frame 535 surrounds the stator coils 550, 555. As a result, the second magnetic field generated by the stator coils 550, 555 is intensified in the area of the piston coil 540 and the repulsive force between the stator 530 and the working piston 520 is increased.

Figure 4:
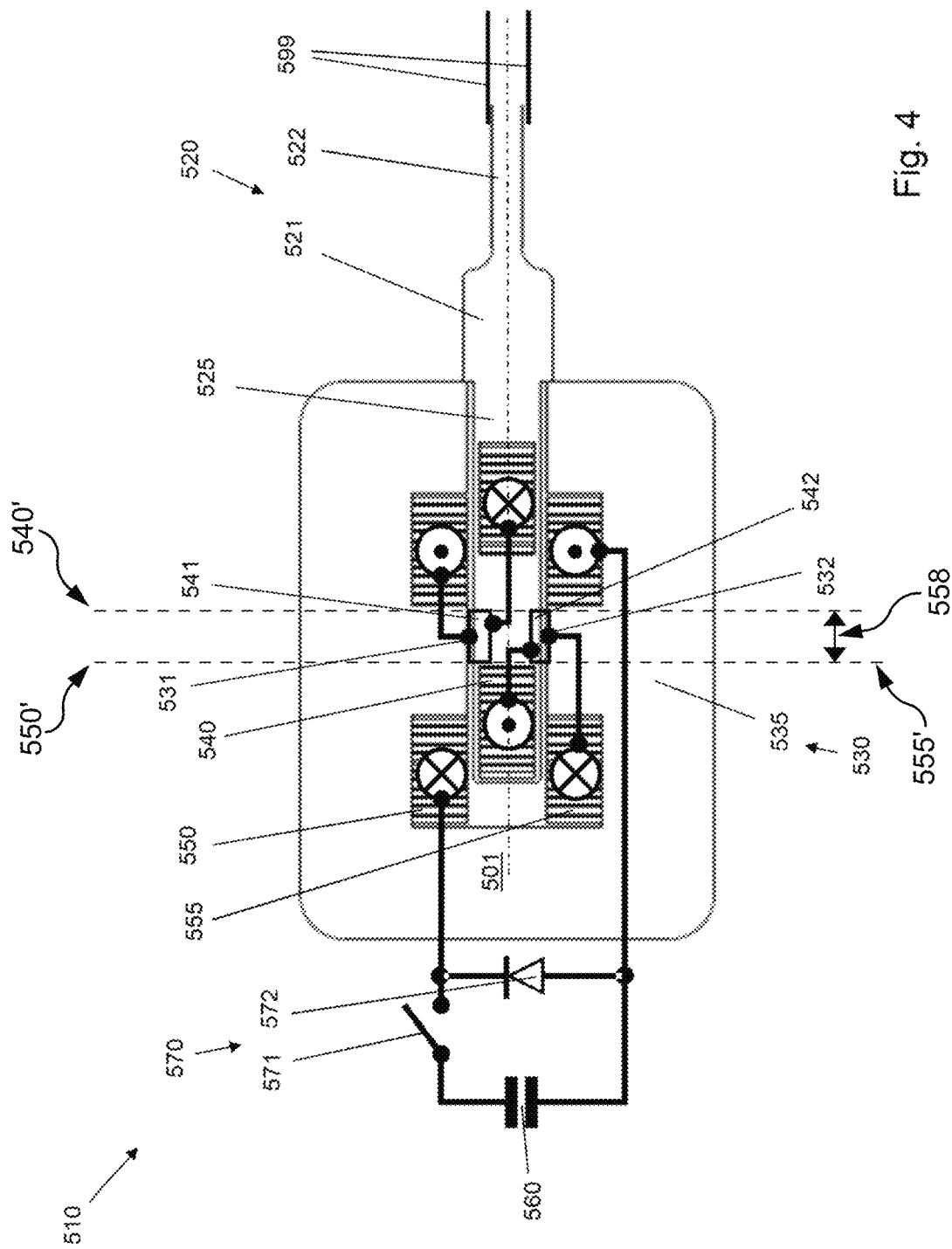
FIG. 4 shows a drive of a tool.

In the starting position shown in FIG. 4, the piston coil axis (540') is arranged offset (598) relative to the stator coil axes (550', 555') in the direction of the working axis 501. This improves repulsion in the direction of the working axis 501. For guiding the working piston 520 along the working axis 501, the tool has a guide 599, for example formed as a guide rail.

Wherein the drive has a diode which is arranged on the working piston and is electrically connected to the piston coil. An advantageous embodiment is characterized in that the drive has a switching circuit comprising the diode, by means of which the rapid discharge is triggered and/or the piston coil is electrically connected to the capacitor.

Figure 5:
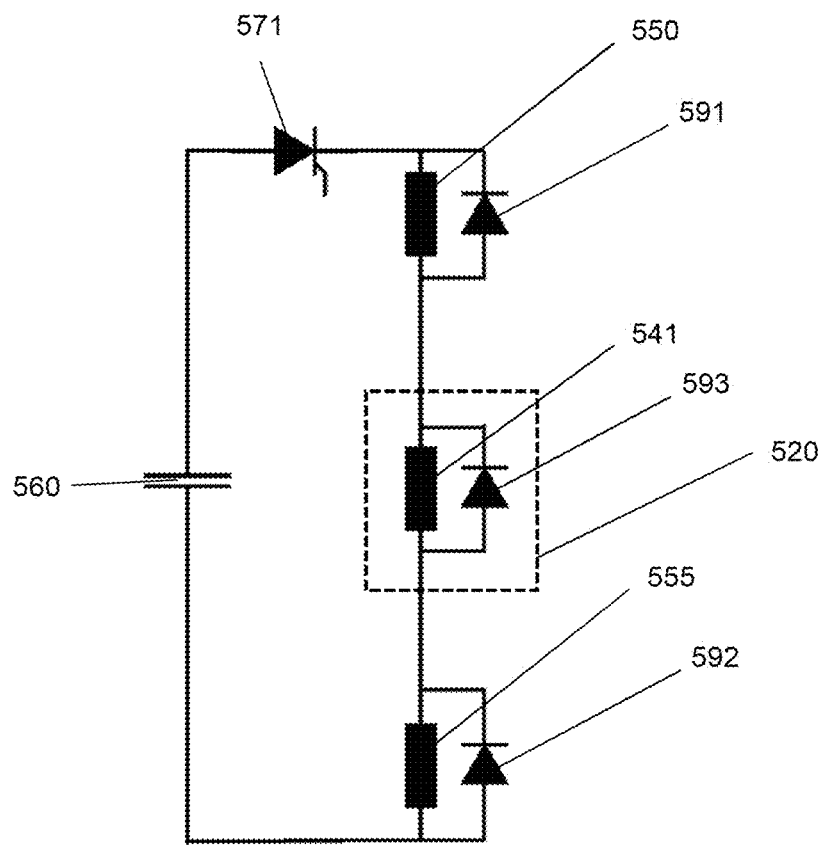
FIG. 5 shows an electrical circuit diagram of a drive.

In FIG. 5, an electrical circuit diagram of the drive 510 shown in FIG. 4 is illustrated. In addition to the capacitor 560, the switch 571, the piston coil 541, the first stator coil 550 and the second stator coil 555, the drive 510 comprises a first diode 591 assigned to the first stator coil 550, a second diode 592 assigned to the second stator coil and a piston diode 593 assigned to the piston coil 541. The piston diode 593 is an exemplary embodiment of a current control element for controlling the electrical current flowing through the piston coil 541. The coils 541, 550, 555 form an oscillating circuit with the capacitor 560. The current control element 593 then serves the purpose of preventing this oscillating circuit from oscillating back after the capacitor 560 has discharged. The piston contacts shown in FIG. 4 are thereby de-energized, so that the risk of electrical flashovers between the piston contacts and the stator contacts is reduced. This can be used to shorten the contact rails involved, in particular to a sliding length that is shorter than a movement path of the working piston 520 along the working axis. This is made possible by an arrangement, in particular fastening, of the current control element 593 on the working piston 520. In the embodiment shown in FIG. 5 as a freewheeling diode, the diode 593 is electrically connected in parallel with the piston coil 541.

The invention has been described using a series of exemplary embodiments that are illustrated in the drawings and exemplary embodiments that are not illustrated. The individual features of the various exemplary embodiments are applicable individually or in any desired combination with one another, provided that they are not contradictory. It is pointed out that the tool according to the invention can also be used for other applications, for example as a hammer drill or the like.

The invention claimed is:

1. A tool for working a substrate, the tool having a stator and a working piston, which is intended to move relative to the stator along a working axis, the tool having a drive, which is intended to drive the working piston from a starting position along the working axis to the substrate, the drive comprising a piston coil arranged on the working piston and a first stator coil arranged on the stator, the piston coil having a piston coil axis, which is oriented transversely to the working axis.

2. The tool as claimed in claim 1, the first stator coil having a first stator coil axis, which is oriented parallel to the piston coil axis.

3. The tool as claimed in claim 2, the piston coil axis being arranged offset relative to the first stator coil axis in the direction of the working axis when the working piston is in the starting position.

4. The tool as claimed in claim 3, the piston coil and the first stator coil being able to be supplied with current in the same direction in order to generate magnetic fields in the same direction and to accelerate the piston coil axis to the first stator coil axis.

5. The tool as claimed in claim 3, the piston coil and the first stator coil being able to be supplied with current in opposite directions in order to generate opposing magnetic fields and to accelerate the piston coil axis away from the first stator coil axis.

6. The tool as claimed in claim 2, the piston coil and the first stator coil being able to be supplied with current in the same direction in order to generate magnetic fields in the same direction and to accelerate the piston coil axis to the first stator coil axis.

7. The tool as claimed in claim 2, the piston coil and the first stator coil being able to be supplied with current in opposite directions in order to generate opposing magnetic fields and to accelerate the piston coil axis away from the first stator coil axis.

8. The tool as claimed in claim 2, the drive having a second stator coil arranged on the stator, which is arranged relative to the working axis opposite the first stator coil and has a second stator coil axis, which is oriented parallel to the first stator coil axis the first stator coil and the second stator coil being able to be supplied with current in the same direction in order to generate magnetic fields in the same direction and to accelerate the piston coil along the working axis.

9. The tool of claim 8, wherein the second stator coil axis coincides with the first stator coil axis.

10. The tool as claimed in claim 2, having a guide element for guiding the working piston along the working axis.

11. The tool as claimed in claim 1, having a guide element for guiding the working piston along the working axis.

12. The tool as claimed in claim 11, the drive having a second stator coil arranged on the stator, which is arranged relative to the working axis opposite the first stator coil and has a second stator coil axis, which is oriented parallel to the first stator coil axis, the first stator coil and the second stator coil being able to be supplied with current in the same direction in order to generate magnetic fields in the same direction and to accelerate the piston coil along the working axis.

13. The tool as claimed in claim 1, the drive having a first capacitor, the first stator coil and/or the piston coil being electrically connectable to the capacitor in order during rapid discharge of the first capacitor to have a current flowing through it and to generate the magnetic field.

14. The tool as claimed in claim 1, the piston coil and the first stator coil being electrically connected to one another in series and wound in the same direction or in opposite directions relative to one another.

15. The tool as claimed in claim 1, the piston coil having a piston coil outer diameter, and the first stator coil having a stator coil outer diameter which is essentially the same size as the piston coil outer diameter.

16. The tool as claimed in claim 1, the stator having two electrical stator contacts and the working piston having two electrical piston contacts respectively sliding on one of the two electrical stator contacts.

17. The tool as claimed in claim 16, the two electrical stator contacts each having a contact rail and the two electrical piston contacts each having a contact brush or a slip ring, or vice versa.

18. The tool as claimed in claim 1, the stator having a stator frame of a soft magnetic material, which surrounds the first stator coil.

19. The tool as claimed in claim 1, having a receptacle which is intended to receive a fastening element, the working piston or the stator being intended to transfer a fastening element received in the receptacle into the substrate along the working axis.

20. The tool of claim 1, wherein the piston coil axis is oriented perpendicularly to the working axis.

* * * * *

UNITED STATES PATENT AND TRADEMARK OFFICE
CERTIFICATE OF CORRECTION

PATENT NO. : 12,202,110 B2
APPLICATION NO. : 17/783413
DATED : January 21, 2025
INVENTOR(S) : Chafic Abu Antoun et al.

Page 1 of 1

It is certified that error appears in the above-identified patent and that said Letters Patent is hereby corrected as shown below:

On the Title Page

(72) Inventors:
The correct inventors are, in order, -- Chafic ABU ANTOUN, Buchs (CH); Albert BINDER, Buchs (CH); Florian SCHMID, Buchs SG (CH); Thomas FRANZ, Liesberg Dorf (CH); Reto CHRISTEN, Uster (CH); Jasmin SMAJIC, Schöfflisdorf (CH); Arno MECKLENBURG, Berlin (DE) --

Signed and Sealed this
Fifteenth Day of July, 2025

Coke Morgan Stewart
*Acting Director of the United States Patent and Trademark Office*